United States Patent [19]

Vistain

[11] 4,173,070
[45] Nov. 6, 1979

[54] CUTTING TOOL FOR METALS AND PLASTICS

[76] Inventor: James Vistain, 1320 Bonnie Glenn La., Glenview, Ill. 60025

[21] Appl. No.: 883,126

[22] Filed: Mar. 3, 1978

[51] Int. Cl.² ............................................. B26B 15/00
[52] U.S. Cl. ................................................... 30/241
[58] Field of Search ........................... 30/241, 242, 243

[56] References Cited

U.S. PATENT DOCUMENTS

| 2,114,753 | 4/1938 | Waner | 30/241 X |
|---|---|---|---|
| 2,329,387 | 9/1943 | Brenning | 30/242 X |
| 2,542,103 | 2/1951 | Adel | 30/241 |
| 2,598,287 | 5/1952 | Murphy | 30/241 X |
| 2,750,667 | 6/1956 | Johnson | 30/241 X |

*Primary Examiner*—Jimmy C. Peters
*Attorney, Agent, or Firm*—Hill, Van Santen, Steadman, Chiara & Simpson

[57] ABSTRACT

A hand held tool for shearing individual chips from a sheet material such as sheet metal or plastic which includes a pair of hollow handle members, a relatively stationary pivot means interconnecting the handle members for relative pivotal movement therebetween, and a cutter support means secured to one of the handle members. A cutter element is reciprocable within the cutter support means. The cutter element is interconnected with the handle members such that the cutter element moves downwardly upon moving the pair of handle members toward each other. The cutter support means includes an aperture over which the sheet material to be sheared can be received. Limit means are provided for limiting the extent to which the sheet material can be inserted into the cutting area so that movement of the cutter element cuts a chip which is of lesser cross-sectional area than the aperture. The configuration of the cutter element cooperates with a discharge means which communicates with the hollow interior of the handle member to discharge chips sheared by the cutter means and falling through the aperture.

4 Claims, 10 Drawing Figures

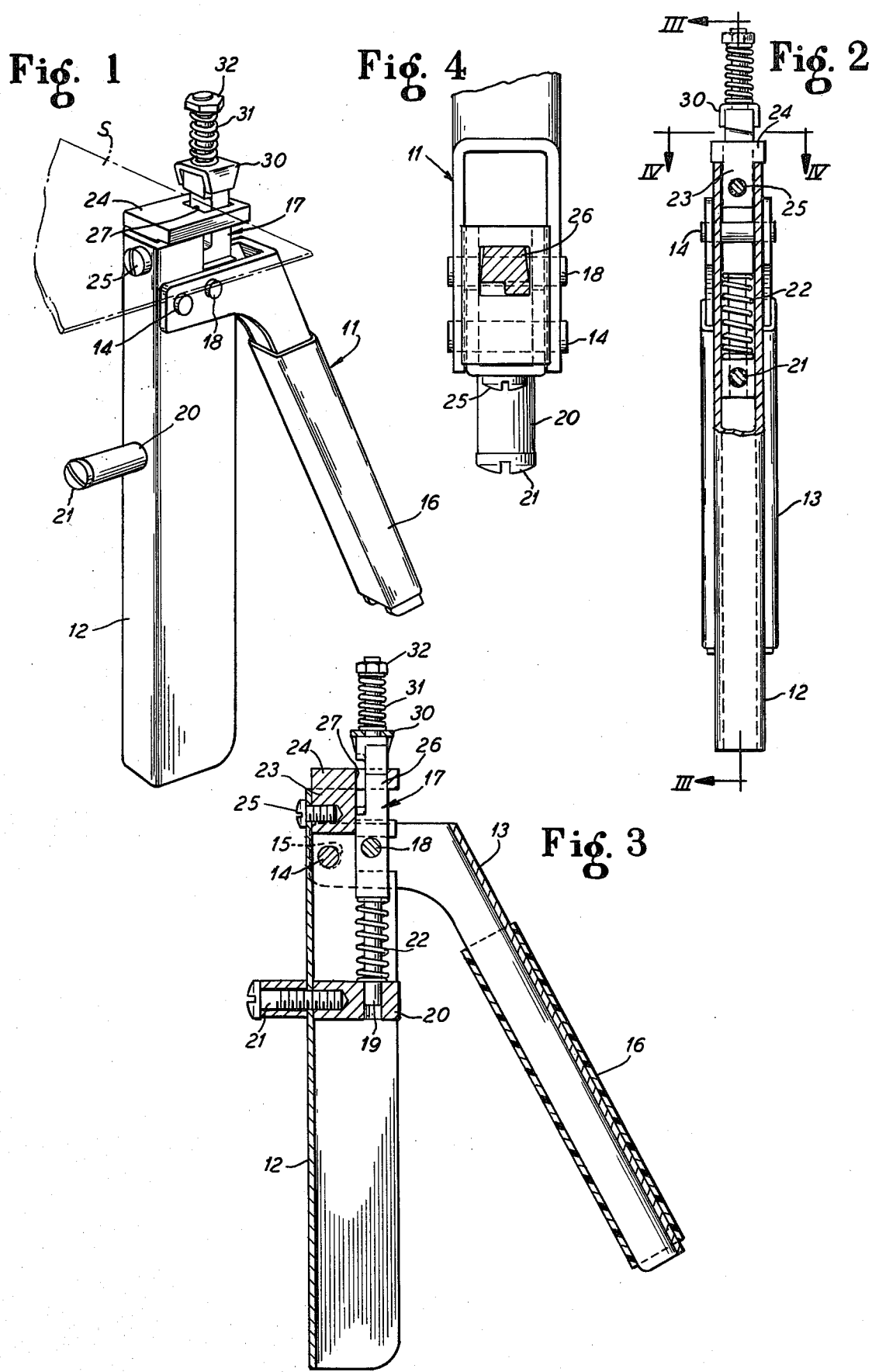

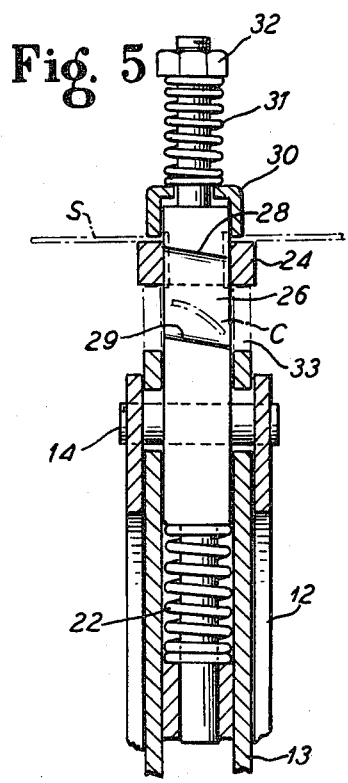
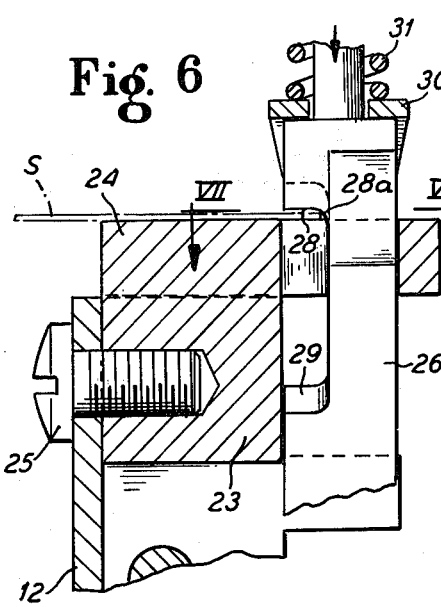
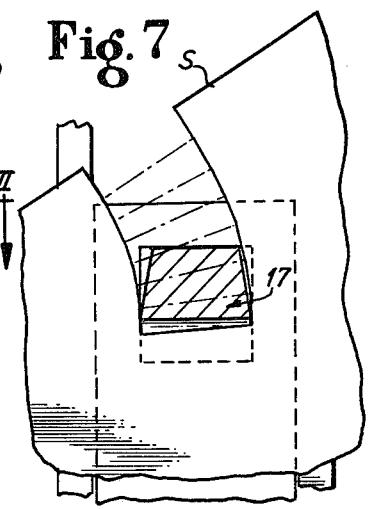
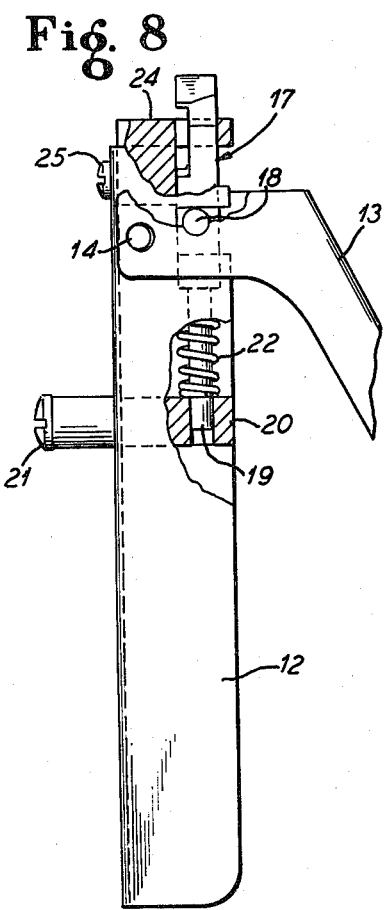
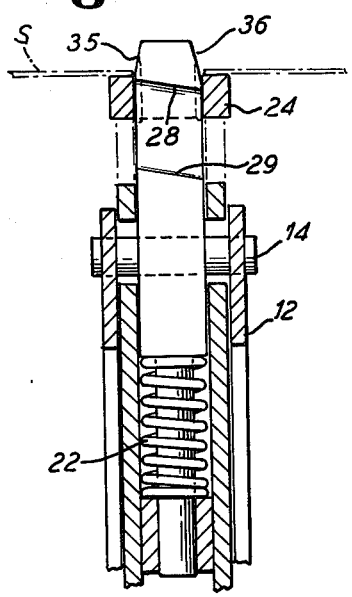
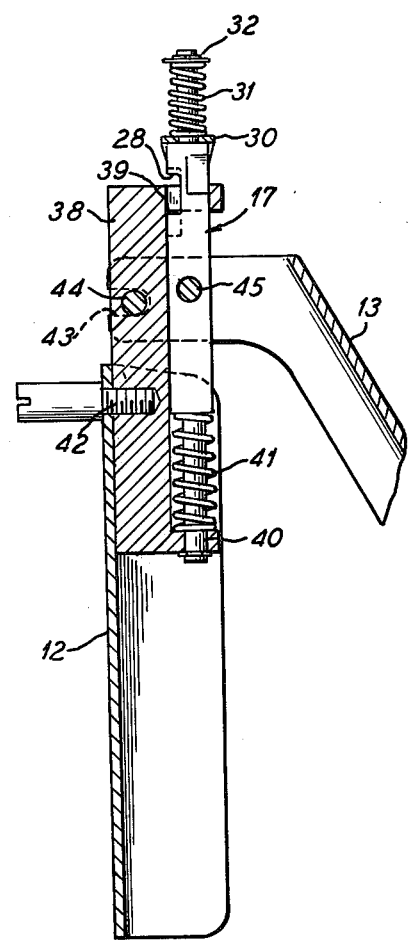

CUTTING TOOL FOR METALS AND PLASTICS

BACKGROUND OF THE INVENTION

1. Field of the Invention

This invention is in the field of hand tools of the type commonly referred to as "nibbling" tools which operate to cut a small chip out of the material upon each downward stroke of the cutting edge. The cutting strokes can be made in rapid succession and quite easily, with sufficient leverage being available to allow cutting of relatively heavy materials. The arrangement of the cutting edge and the geometry of the cutting element are such that the cutting direction can be varied incrementally between cuts so as to provide an almost limitless geometry of cuts.

2. Description of the Prior Art

The only prior art with which the applicant is familiar is Adel U.S. Pat. No. 2,542,103 directed to a nibbling tool. This device included an elongated frame having spaced walls, and a stationary cutting edge extending between the walls. A cutter bar was mounted in the frame between the walls for guided longitudinal reciprocation. A movable cutting edge was provided for cooperating with the stationary cutting edge during the nibbling stroke. A lever was pivotally mounted on the frame and had a portion disposed between the walls of the frame and directly engaged with the part on the cutter for starting the nibbling stroke, together with a spring for urging the cutter bar during the return stroke back to its normal position.

Tools apparently produced under the Adel patent were on the market but met with limited success. Such tools were rather limited in their ability to cut different sized apertures and they were sometimes presented with the problem of clogging of the tool upon successive cuts.

SUMMARY OF THE INVENTION

The present invention provides a hand tool for shearing individual chips from a sheet material such as metal or plastic and comprises a pair of hollow handle members interconnected by means of a relatively stationary pivot means which permit relative pivotal movement between the pair of handle members. A cutter support means is secured to one of the handle members and a cutter element is provided to reciprocate within the cutter support means. Means are provided which interconnect the cutter element with the handle members to cause downward movement of the cutter element upon moving the pair of handle members toward each other, the cutter support means including an aperture over which the sheet material to be sheared can be received. Limit means such as a rounded surface on the cutting element are provided to limit the extent to which the sheet material can be inserted so that movement of the cutter element cuts a chip which is of lesser cross-sectional area than the aperture. A discharge means communicates with the hollow interior of the handle members to discharge chips sheared by the cutter means and falling through the aperture.

In a preferred form of the invention, there is provided a stripper means which is fastened to the cutter element and a stripper spring which urges the stripper means into sheet-clamping engagement during downward movement of the cutter element.

In a further preferred embodiment of the invention, the cutting edge of the cutting element is formed in a section of the cutting element which has a trapezoidal horizontal cross-section. The cutting element is preferably formed with a relieved surface which provides an inclined cutting edge and a spaced substantially parallel surface which guides a cut chip to the discharge means.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a view in perspective of the improved cutting tool of the present invention;

FIG. 2 is a view partly in elevation and partly in cross-section of the tool shown in FIG. 1;

FIG. 3 is a cross-sectional view taken substantially along the line III—III of FIG. 2;

FIG. 4 is a cross-sectional view taken substantially along the line IV—IV of FIG. 2;

FIG. 5 is a fragmentary cross-sectional view illustrating the tool during the cutting operation;

FIG. 6 is an enlarged view, partly in cross-section, of the cutting area of the tool;

FIG. 7 is an enlarged view taken substantially along the line VII—VII of FIG. 6 illustrating the manner in which the tool is adaptable to successive cuts which produce an overall circular cut;

FIG. 8 is a modified form of the invention which does not utilize a stripper element, per se;

FIG. 9 is a view partly in elevation and partly in cross-section of the device shown in FIG. 8; and FIG. 10 is a cross-sectional view of still another form of the invention.

DESCRIPTION OF THE PREFERRED EMBODIMENTS

In FIG. 1, reference numeral 11 has been applied generally to an improved cutting tool or nibbling tool according to the present invention. The tool 11 includes a handle formed from a handle member 12 having a generally U-shaped configuration in cross-section which cooperates with a second handle member 13 also of hollow configuration. The two handle members are interconnected by means of a pivot pin 14 which is located in an oversized aperture 15. This provides a relatively stationary pivot means between the two handle members. By "relatively stationary" I mean that the handle member 13 pivots with respect to the handle member 12 upon grasping the two, and the oversized aperture 15 accommodates the slight arcuate movement which is involved during such pivoting, as will be apparent from a succeeding portion of this specification.

The handle member 13 may be provided with a sleeve 16 or the like composed of a resilient material for better gripping. A cutter element generally indicated at reference numeral 17 is mounted for reciprocation within the hollow interior of the handle member 12. It is secured to the second handle member 13 by means of a pin 18. An end portion 19 of the cutter element is received in an aperture formed in a cutter guide 20 which cutter guide is secured to the handle member 12 by means of a screw 21. A helical spring 22 acts against the cutter guide 20 and urges the cutter element 17 upwardly out of cutting engagement with the workpiece during the return stroke.

A cutter support is received in the upper end of the first handle member 12, the support consisting of a body portion 23 and a flange portion 24. The body portion is secured within the upper end of the handle member by means of a screw 25.

The cutter element 17 has a shank portion 26 which is arranged for reciprocation through an aperture 27 formed in the flange portion 24 of the cutter support. Configuration of the shank portion 26 is best illustrated in FIGS. 5 and 6 of the drawings. As there illustrated, the shank portion is relieved to provide an upper cutting edge 28 and a lower angular edge 29 parallel to it which acts as a guide for discharging chips when the chips are cut by the cutting edge. As best illustrated in FIG. 4, the shank portion 26 has a trapezoidal configuration and the cutting edge 28 is arranged to provide an essentially trapezoidally shaped chip which is of smaller cross-sectional dimension than the rectangular or square aperture 27. This feature prevents the chip from becoming jammed in the aperture during cutting and permits its free release.

Also disposed on the cutter element 17 is a stripper 30 also of a generally U-shaped cross-sectional configuration. The stripper is acted upon by a stripper spring 31 which has one end bottomed against a nut 32 secured to a threaded end portion of the cutter element 17.

An important feature of the present invention is illustrated in FIG. 6 of the drawings. As there illustrated, the cutting edge 28 is formed with a small radius 28a. When a sheet S of material is introduced into the cutting area as shown in FIG. 6, the radius 28a prevents the sheet S from bridging the entire gap and therefore when the cutter edge 28 shears the chip off, there is automatically a clearance provided between the chip and the edge of the tool so that the chip C drops downwardly as illustrated in FIG. 5 and eventually follows the surface 29 downwardly and outwardly through an opening 33 provided for that purpose. At this time, the stripper 30 engages with the sheet S as shown in FIG. 5 to clamp the sheet S against the cutter support flange 24 during the cutting action.

In FIG. 7, there is illustrated rather schematically the progress of a cutting tool according to the present invention after sequential cuts. Because of the geometry of the tool, and the trapezoidal nature of the cut, the tool can be swung in either direction in progressive cuts so that practically any configuration of cut can be built up. In contrast, prior art tools that normally turned in only one direction would be limited in the geometry of the overall cut which could be made.

In FIGS. 8 and 9, there is illustrated a further embodiment of the present invention. Where appropriate, the same reference numerals have been used as in the preceding embodiment. In this form of the invention, however, the stripper of the previous embodiment is dispensed with and instead, the upper end of the cutter element 17 is provided with an inward taper on both ends as shown by the tapered surfaces 35 and 36 in FIG. 9. Thus when the cutting edge 28 moves through the sheet S, there will be no tendency, because of the clearance provided between the surfaces 35 and 36 with respect to the cut sheet to bind against the chip which has already been cut.

In the form of the invention shown in FIG. 10, the cutter element 17 is substantially identical with the cutter element of FIGS. 1 to 7, inclusive. Instead, the cutter guide and the cutter support means are part of an integral structure 38. In this structure 38 there is provided the aperture 39 through which the cutter moves, and a bore through which a lower end portion 40 of the cutter element 17 is received. A spring 41 is provided for the return stroke, as in the first-named embodiment. A screw 42 holds the structure 38 within the hollow interior of the first handle member 12.

Another variation occurs in the nature of the pivotal connection between the two handle members. In the form of the invention shown in FIG. 10, the end of the second handle member 13 is provided with a slot 43 which receives a pivot pin 44. The cutter element 17 in turn is secured to the second handle member 13 by means of a pin 45. The slot 43 thus takes the place of the oversized aperture 15 of FIG. 3 in that it provides for pivotal movement of the two handle members 12 and 13 with respect to each other, and still allows for a certain amount of arcuate displacement which is inherent in the pivotal movement.

The cutting tool of the present invention finds use in model shops, metal craft operations, and the like, and is useful with various types of sheet material such as aluminum, brass or plastic materials. With the arrangement shown in the drawings, the cutting tool of the present invention cuts a reasonably large chip, and cuts it cleanly so that there is no tendency for the severed chip to bind the operation of the cutting device. Furthermore, the device of the present invention can be positioned in very hard to reach places because of the capability to swing the tool in either direction in progressive cuts. The tool of the present invention can be operated with cutting strokes in rapid succession, and with relative ease because of the high leverage involved. The ratio of the travel of the cutter and the actuating handle is such as to allow cutting of heavier materials than other hand operated devices due to this higher leverage.

It should be evident that various modifications can be made to the described embodiments without departing from the scope of the present invention.

I claim as my invention:

1. A hand tool for shearing individual chips from a relatively stiff sheet material which comprises:
   a pair of hollow handle members,
   a relatively stationary pivot means interconnecting said handle members to permit relative pivotal movement therebetween,
   a cutter support means secured to one of said handle members,
   a cutter element reciprocable within said cutter support means,
   said cutter element having a cutting edge having a relatively small radius formed thereon,
   means interconnecting said cutter element with the handle members to cause downward movement of said cutter element upon movement of said pair of handle members toward each other,
   said cutter support means including an aperture over which the sheet material to be sheared is received, the size of the aperture being greater than the chip severed from said sheet by said cutter element by virtue of said radius preventing said sheet from bridging said aperture, and
   discharge means communicating with the hollow interior of the handle member to discharge chips sheared by said cutter means and falling through said aperture.

2. A hand tool according to claim 1 in which said cutter element has a trapezoidal cross-section adjacent the cutting area permitting the tool to be swung in either direction in progressive cuts.

3. A hand tool according to claim 1 in which:
said cutter element has a lower angular edge parallel to its upper cutting edge to act as a guide for discharging chips cut by the cutting edge.

4. A hand tool according to claim 1 which includes:
a pivot pin interconnecting said two handle members,
said pivot pin being received in a slightly oversized aperture to accommodate slight arcuate movement, and
a pin operatively connected to said cutter element and one of said handle members,
whereby slightly arcuate movement of said pivot pin permits vertical reciprocation of said pin and the cutter element connected thereto.

* * * * *